US011111384B1

(12) United States Patent
Ochiai et al.

(10) Patent No.: US 11,111,384 B1
(45) Date of Patent: Sep. 7, 2021

(54) POLYAMIDE RESIN COMPOSITION FOR BLOW-MOLDED PRODUCTS EXPOSED TO HIGH-PRESSURE HYDROGEN, AND BLOW-MOLDED PRODUCT

(71) Applicant: Toray Industries, Inc., Tokyo (JP)

(72) Inventors: Shinichiro Ochiai, Nagoya (JP); Shota Suzuki, Nagoya (JP); Sadayuki Kobayashi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/262,627

(22) PCT Filed: Jul. 29, 2019

(86) PCT No.: PCT/JP2019/029608
§ 371 (c)(1),
(2) Date: Jan. 22, 2021

(87) PCT Pub. No.: WO2020/027031
PCT Pub. Date: Feb. 6, 2020

(30) Foreign Application Priority Data

Jul. 31, 2018 (JP) ............................ JP2018-143657

(51) Int. Cl.

| | |
|---|---|
| ***C08L 77/02*** | (2006.01) |
| ***C08K 3/16*** | (2006.01) |
| ***C08F 222/06*** | (2006.01) |
| ***B29C 49/04*** | (2006.01) |
| ***B29C 49/00*** | (2006.01) |
| ***F17C 1/16*** | (2006.01) |
| ***C08L 23/26*** | (2006.01) |
| *B29K 77/00* | (2006.01) |
| *B29L 31/00* | (2006.01) |

(52) U.S. Cl.
CPC .......... *C08L 77/02* (2013.01); *B29C 49/0005* (2013.01); *B29C 49/04* (2013.01); *C08F 222/06* (2013.01); *C08K 3/16* (2013.01); *C08L 23/26* (2013.01); *F17C 1/16* (2013.01); *B29K 2077/00* (2013.01); *B29K 2995/0089* (2013.01); *B29L 2031/7156* (2013.01); *C08L 2203/30* (2013.01); *F17C 2203/0604* (2013.01); *F17C 2203/066* (2013.01); *F17C 2209/2127* (2013.01); *F17C 2221/012* (2013.01)

(58) Field of Classification Search
CPC ........... B29C 49/00; B29C 49/04; C08K 7/00; C08K 3/16; C08L 81/02; C08L 77/02; C08L 101/12; C08L 23/26; B29K 81/00; B29L 22/00
See application file for complete search history.

(56) References Cited

U.S. PATENT DOCUMENTS

| | | | | |
|---|---|---|---|---|
| 2009/0203845 | A1 | 8/2009 | Fukui et al. | |
| 2014/0034654 | A1 | 2/2014 | Dullaert et al. | |
| 2017/0335106 | A1* | 11/2017 | Jung | C08L 77/06 |
| 2017/0342266 | A1* | 11/2017 | Jung | C08K 7/14 |

FOREIGN PATENT DOCUMENTS

| | | | |
|---|---|---|---|
| JP | 2017-226817 | A | 12/1917 |
| JP | 7-137161 | A | 5/1995 |
| JP | 2007-191631 | A | 8/2007 |
| JP | 2007-204675 | A | 8/2007 |
| JP | 2009-191871 | A | 8/2009 |
| JP | 2014-501818 | A | 1/2014 |

* cited by examiner

*Primary Examiner* — Robert D Harlan
(74) *Attorney, Agent, or Firm* — DLA Piper LLP (US)

(57) ABSTRACT

A polyamide resin composition for a blow-molded article exposed to high-pressure hydrogen gas contains: 70 to 99 parts by weight of a polyamide 6 resin (A); 1 to 30 parts by weight of an impact modifier (B); and 0.005 to 1 parts by weight of a metal halide (C) with respect to a total of 100 parts by weight of the polyamide 6 resin (A) and the impact modifier (B). The polyamide resin composition has a melt tension of 20 mN or more when measured at 260° C. and a take-up speed at strand break of 50 m/min or more when measured at 260° C.

9 Claims, No Drawings

POLYAMIDE RESIN COMPOSITION FOR BLOW-MOLDED PRODUCTS EXPOSED TO HIGH-PRESSURE HYDROGEN, AND BLOW-MOLDED PRODUCT

TECHNICAL FIELD

This disclosure relates to a polyamide resin composition for a blow-molded article exposed to high-pressure hydrogen gas that contains specific amounts of a polyamide 6 resin, an impact modifier, and a metal halide, and is controlled to a specific melt tension and take-up speed at strand break, and a blow-molded article obtained by molding the same.

BACKGROUND

In recent years, to respond to depletion of petroleum fuels and demand for reduction of an amount of emission of harmful gas, fuel cell electric vehicles have attracted attention, in which fuel cells generating electricity by electrochemically reacting hydrogen gas with oxygen gas in the air are installed in automobiles, and the electricity generated by the fuel cells is supplied to a motor to provide a driving force. As a tank for high-pressure hydrogen gas mounted in the fuel cell electric vehicle, a resin tank has been studied, in which the outside of a resin liner is reinforced with a carbon fiber reinforced resin. However, hydrogen gas having a small molecular size is apt to permeate through the resin compared to natural gas having a relatively large molecular size, and the amount of high-pressure hydrogen gas accumulated in the resin is more than that of normal-pressure hydrogen gas. This causes a problem that the conventional resin tank is deformed or destroyed if charging and discharging of high-pressure hydrogen gas are repeated.

As a material for hydrogen gas tank liners having excellent gas barrier properties and excellent impact resistance even at low temperatures, for example, a material for hydrogen gas tank liners composed of a polyamide resin composition containing polyamide 6, a copolymerized polyamide, and an impact modifier has been studied (see, for example, Japanese Patent Laid-Open Publication No. 2009-191871).

As a liner for gas storage tanks having excellent gas barrier properties, for example, a liner for gas storage tanks containing a polymer composition containing a polyamide, a nucleating agent, and an impact resistance modifier has been studied (for example, National Publication of International Patent Application No. 2014-501818).

Examples of a method of producing a molded article exposed to high-pressure hydrogen gas include injection-molding, extrusion-molding, and blow-molding. Among them, when a large molded article is molded, the molded article may be molded by blow-molding, but drawdown may occur during blow-molding, which cannot provide the molded article, or tearing may occur when air is blown, which cannot provide the molded article. Therefore, to blow-mold the large molded article, a material having excellent drawdown resistance and blow moldability such as no tearing when air is blown is required.

Furthermore, the blow-molding tends to have a longer detention time during molding than that of the injection-molding so that the resin may be decomposed during the detention to reduce the toughness of the molded article. Therefore, for a resin composition for blow-molding, a material that is less likely to be decomposed during detention is required. Furthermore, when the blow-molded article is obtained and the residual strain of the obtained blow-molded article locally remains, defects and cracks may occur from locations in which a local residual strain remains when charging and discharging of high-pressure hydrogen gas are repeated. Therefore, the resin composition for blow-molding exposed to high-pressure hydrogen gas is required not to generate the local residual strain after molding. In the blow-molding, non-uniform stretching is apt to cause a residual strain to locally remain. One of factors causing the non-uniform stretching is a low melt tension.

However, the hydrogen gas tank liner described in Japanese Patent Laid-Open Publication No. 2009-191871 is apt to cause permeation of hydrogen gas and dissolution of hydrogen gas in a resin that disadvantageously causes defects in the hydrogen gas tank liner if charging and discharging of high-pressure hydrogen gas are repeated. The polyamide resin composition disadvantageously has a low melt tension and poor drawdown resistance, which cannot provide a blow-molded article.

The liner for gas storage tanks described in National Publication of International Patent Application No. 2014-501818 has excellent helium gas permeation resistance, but the liner is apt to cause permeation of hydrogen gas and dissolution of hydrogen gas in a resin that disadvantageously causes defects in the hydrogen gas tank liner if charging and discharging of high-pressure hydrogen gas are repeated. The polyamide resin composition disadvantageously has a low melt tension and poor drawdown resistance, which cannot provide a blow-molded article.

In view of the above problems of the conventional techniques, it could be helpful to provide a polyamide resin composition having excellent blow moldability and melt stability, is less likely to cause a local increase in a residual strain, and can provide a blow-molded article suppressing the occurrence of defects even if charging and discharging of high-pressure hydrogen gas are repeated.

SUMMARY

We thus provide:

A polyamide resin composition for a blow-molded article exposed to high-pressure hydrogen gas, the polyamide resin composition contains: 70 to 99 parts by weight of a polyamide 6 resin (A); 1 to 30 parts by weight of an impact modifier (B); and 0.005 to 1 parts by weight of a metal halide (C) with respect to a total of 100 parts by weight of the polyamide 6 resin (A) and the impact modifier (B), wherein the polyamide resin composition has a melt tension of 20 mN or more when measured at 260° C. and a take-up speed at strand break of 50 m/min or more when measured at 260° C.

A polyamide resin composition for a blow-molded article, wherein the polyamide 6 resin (A) has a relative viscosity ($\eta r$) of 3.3 to 7.0 at a temperature of 25° C. in a 98% sulfuric acid solution having a resin concentration of 0.01 g/ml. An ethylene/$\alpha$-olefin copolymer modified with an unsaturated carboxylic acid and/or its derivative is used as the impact modifier (B). Furthermore, the polyamide resin composition for a blow-molded article, wherein an amount of the unsaturated carboxylic acid and/or its derivative introduced from the modification is 0.1 to 2.5 parts by weight with respect to 100 parts by weight of the ethylene/$\alpha$-olefin copolymer modified with the unsaturated carboxylic acid and/or its derivative.

A blow-molded article exposed to high-pressure hydrogen gas containing the polyamide resin composition.

Since a polyamide resin composition for a blow-molded article exposed to high-pressure hydrogen gas has a high melt tension and excellent drawdown resistance, and can withstand a high take-up speed, the polyamide resin composition is less likely to cause tearing to occur when air is blown to provide excellent blow moldability. Furthermore, it is possible to provide a blow-molded article that is less likely to cause a local residual strain to occur after molding, and suppresses the occurrence of defects even if charging and discharging of high-pressure hydrogen gas are repeated, and has excellent melt stability.

Since our blow-molded article can suppress a local increase in a residual strain, defects are less likely to occur even if charging and discharging of high-pressure hydrogen gas are repeated, and the feature of excellent melt stability is utilized, whereby the blow-molded article can be usefully developed as a blow-molded article used for applications in which the blow-molded article is exposed to the high-pressure hydrogen gas.

DETAILED DESCRIPTION

Hereinafter, our compositions and blow-molded products are described in more detail.

A polyamide resin composition for a blow-molded article exposed to high-pressure hydrogen gas (hereinafter, may be described as "polyamide resin composition") contains: 70 to 99 parts by weight of a polyamide 6 resin (A); 1 to 30 parts by weight of an impact modifier (B); and 0.005 to 1 parts by weight of a metal halide (C) with respect to a total of 100 parts by weight of the polyamide 6 resin (A) and the impact modifier (B). The polyamide resin composition has a melt tension of 20 mN or more when measured at 260° C. and a take-up speed at strand break of 50 m/min or more when measured at 260° C. That is, when the polyamide resin composition is melted at 260° C. and discharged, the polyamide resin composition can be taken up without being broken when the take-up speed is 50 m/min or less.

First, the features of the polyamide 6 resin (A) and the impact modifier (B) will be schematically described.

The polyamide 6 resin (A) has an excellent balance among moldability, gas barrier properties, rigidity, and toughness. The polyamide 6 resin (A) can withstand a high take-up speed, but if the relative viscosity of the polyamide 6 resin (A) is too high to increase the melt tension, kneading defectiveness is apt to occur. Furthermore, the polyamide 6 resin (A) has a high crystallinity and can suppress permeation of hydrogen gas and dissolution of hydrogen in the resin, whereby a polyamide resin composition can be provided that can provide a blow-molded article in which defects are less likely to occur even if charging and discharging of high-pressure hydrogen gas are repeated.

The impact modifier (B) desirably has good compatibility with the polyamide 6 resin (A), and a small dispersion diameter when kneaded with the polyamide 6 resin (A). We found that the melt tension of the polyamide resin composition at a high temperature can serve as an index. The polyamide composition containing the polyamide 6 resin (A) and the impact modifier (B) has a high melt tension and, as a result, the polyamide composition has excellent drawdown resistance and good flowability to provide smooth stretching, whereby a residual strain is less likely to occur. A specific amount of the impact modifier (B) is blended with the polyamide 6 resin (A), to provide a polyamide resin composition having improved toughness. A blow-molded article used for applications in which the blow-molded article is exposed to high-pressure hydrogen gas repeatedly shrinks and expands during charging and discharging of high-pressure hydrogen gas, which is apt to cause cracks. A specific amount of the impact modifier (B) is blended, whereby even if the blow-molded article repeatedly shrinks and expands during charging and discharging of high-pressure hydrogen gas, the cracks of the blow-molded article can be suppressed.

Furthermore, a specific amount of the metal halide (C) is blended, whereby the melt stability of the polyamide resin composition can be improved. The blow-molded article used for applications in which the blow-molded article is exposed to high-pressure hydrogen gas has a long detention time during blow-molding, which is apt to cause the blow-molded article having deteriorated toughness. A specific amount of the metal halide (C) is blended, whereby, even if the detention time is long during such blow-molding, the deteriorated toughness of the blow-molded article can be suppressed.

Polyamide 6 Resin (A)

The polyamide 6 resin (A) is a polyamide resin mainly composed of 6-aminocaproic acid and/or ε-caprolactam. Other monomers may be copolymerized as long as the desired effect is not impaired. "Mainly composed of" means that units derived from 6-aminocaproic acid or units derived from ε-caprolactam are contained in a total amount of 50 mol % or more with respect to a total of 100 mol % of monomer units constituting the polyamide resin. The units derived from 6-aminocaproic acid or the units derived from ε-caprolactam are more preferably contained in an amount of 70 mol % or more, and still more preferably 90 mol % or more.

Examples of other monomers to be copolymerized include amino acids such as 11-aminoundecanoic acid, 12-aminododecanoic acid, and p-aminomethylbenzoic acid; lactams such as ω-laurolactam; aliphatic diamines such as tetramethylenediamine, pentamethylenediamine, hexamethylenediamine, 2-methylpentamethylenediamine, undecamethylenediamine, dodecamethylenediamine, 2,2,4-/2,4,4-trimethylhexamethylenediamine, and 5-methylnonamethylenediamine; aromatic diamines such as m-xylenediamine and p-xylylenediamine; alicyclic diamines such as 1,3-bis (aminomethyl) cyclohexane, 1,4-bis(aminomethyl) cyclohexane, 1-amino-3-aminomethyl-3,5,5-trimethylcyclohexane, bis(4-aminocyclohexyl) methane, bis(3-methyl-4-aminocyclohexyl) methane, 2,2-bis(4-aminocyclohexyl) propane, bis(aminopropyl) piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; and alicyclic dicarboxylic acids such as 1,4-cyclohexanedicarboxylic acid, 1,3-cyclohexanedicarboxylic acid, 1,2-cyclohexanedicarboxylic acid, and 1,3-cyclopentanedicarboxylic acid. Two or more of these monomers may be copolymerized.

The degree of polymerization of the polyamide 6 resin (A) is not particularly limited, but the polyamide 6 resin (A) preferably has a relative viscosity of 3.3 to 7.0, as measured at 25° C. in a 98% concentrated sulfuric acid solution having a resin concentration of 0.01 g/ml. A relative viscosity of 3.3 or more provides the polyamide resin composition having a moderately high melt tension during blow-molding that can provide the polyamide resin composition having further improved drawdown properties. Furthermore, the relative viscosity is more preferably 4.0 or more. Meanwhile, a relative viscosity of 7.0 or less provides the polyamide resin composition having a moderately low melt viscosity during blow-molding that can provide the polyamide resin composition having further improved blow moldability.

The amount of an amino terminal group of the polyamide 6 resin (A) is not particularly limited, but it is preferably $1.0\times10^{-5}$ to $10.0\times10^{-5}$ mol/g. The amount of the amino terminal group of $1.0\times10^{-5}$ to $10.0\times10^{-5}$ mol/g provides a sufficient degree of polymerization that can provide the blow-molded article having improved mechanical strength. The amount of the amino terminal group of the polyamide 6 resin (A) can be determined by dissolving the polyamide 6 resin (A) in a mixed solvent of phenol and ethanol (83.5:16.5 (volume ratio)) and titrating the resulting solution using a 0.02N aqueous hydrochloric acid solution.

Impact Modifier (B)

The impact modifier (B) refers to a polymer having a glass transition temperature of 0° C. or lower. The glass transition temperature can be obtained from an inflection point which occurs when a temperature rises at a temperature rise rate of 20° C./min with a measurement start temperature as −70° C. using a differential scanning calorimeter (DSC). Examples of the impact modifier (B) include olefin resins, acrylic rubber, silicone rubber, fluorine rubber, styrene rubber, nitrile rubber, vinyl rubber, urethane rubber, polyamide elastomers, polyester elastomers, and ionomers. Two or more of these may be blended.

Among these, olefin resins are preferably used because these have excellent compatibility with the polyamide 6 resin (A) and a high toughness improving effect. The olefin resins are thermoplastic resins obtained by polymerizing olefin monomers such as ethylene, propylene, butene, isoprene, and pentene. Copolymers of two or more olefin monomers may also be used, and copolymers of these olefin monomers and other monomers may also be used. Specific examples of the olefin resins include polymers such as polyethylene, polypropylene, polystyrene, poly(1-butene), poly(1-pentene), and polymethylpentene, and copolymers thereof; and ethylene/α-olefin copolymers, ethylene/α,β-unsaturated carboxylate copolymers, α-olefin/α,β-unsaturated carboxylate copolymers, polyolefins obtained by hydrolyzing at least a portion of a copolymer of (ethylene and/or propylene) and a vinyl alcohol ester, copolymers of (ethylene and/or propylene) and (unsaturated carboxylic acid and/or unsaturated carboxylate), polyolefins obtained by substituting at least some of carboxyl groups of copolymers of (ethylene and/or propylene) and (unsaturated carboxylic acid and/or unsaturated carboxylate) with metal ions, block copolymers of conjugated dienes and vinyl aromatic hydrocarbons, and hydrides thereof. Among these, ethylene/α-olefin copolymers and ethylene/α,β-unsaturated carboxylate copolymers are more preferable, and ethylene/α-olefin copolymers are still more preferable.

The above-described olefin resins are desirably modified with an unsaturated carboxylic acid and/or its derivative. As described above, the impact modifier (B) desirably has good compatibility with the polyamide 6 resin (A) and a small dispersion diameter when kneaded with the polyamide 6 resin (A), but to reduce the dispersion diameter, the points are the amount of the impact modifier (B) to be mixed with the polyamide 6 resin (A) and the type of an elastomer of the impact modifier (B). For example, the impact modifier modified with an unsaturated carboxylic acid and/or its derivative has good reactivity with the polyamide 6 resin (A) to provide improved compatibility with the polyamide 6 resin.

The derivative of an unsaturated carboxylic acid is an unsaturated carboxylic acid compound having a carboxyl group whose hydroxy moiety is substituted with any other substituent, and examples thereof include metal salts, acid halides, esters, acid anhydrides, amides, and imides of unsaturated carboxylic acids. Such a modified olefin resin can be used to further improve the compatibility with the polyamide 6 resin (A), to provide further improved blow moldability. Examples of the unsaturated carboxylic acid and its derivative include acrylic acid, methacrylic acid, maleic acid, fumaric acid, itaconic acid, crotonic acid, methyl maleic acid, methyl fumaric acid, mesaconic acid, citraconic acid, glutaconic acid, and metal salts of these carboxylic acids; unsaturated carboxylates such as methyl hydrogen maleate, methyl hydrogen itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, and dimethyl itaconate; acid anhydrides such as maleic anhydride, itaconic anhydride, citraconic anhydride, endo-bicyclo-(2,2,1)-5-heptene-2,3-dicarboxylic acid, and endo-bicyclo-(2,2,1)-5-heptene-2,3-dicarboxylic anhydride; and maleimide, N-ethylmaleimide, N-butylmaleimide, N-phenylmaleimide, glycidyl acrylate, glycidyl methacrylate, glycidyl ethacrylate, glycidyl itaconate, glycidyl citraconate, and 5-norbornene-2,3-dicarboxylic acid. Among these, the unsaturated dicarboxylic acid and its acid anhydride are preferable, and maleic acid or maleic anhydride are particularly preferable.

The unsaturated carboxylic acid or its derivative can be introduced into the olefin resin, for example, by copolymerization of an olefin monomer and an unsaturated carboxylic acid and/or its derivative or by graft introduction of an unsaturated carboxylic acid and/or its derivative into an unmodified olefin resin using a radical initiator.

Some olefin resins into which an unsaturated carboxylic acid and/or its derivative component are/is introduced also contribute to dispersion of an elastomer in the polyamide 6 resin in addition to improvement in impact resistance, to have an effect of reducing a local residual strain when a molded article is molded from the composition.

Regarding the introduction amount of the unsaturated carboxylic acid and/or its derivative component, for example, the amount of the unsaturated carboxylic acid and/or its derivative is preferably 0.1 parts by weight to 2.5 parts by weight with respect to 100 parts by weight of the olefin resin. Specifically, it is preferable that, by the unsaturated carboxylic acid and/or its derivative, the unsaturated carboxylic acid and/or its derivative are/is introduced, and when the weight of the ethylene/α-olefin copolymer modified with the unsaturated carboxylic acid and/or its derivative is 100 parts by weight, the weight of a portion modified with the unsaturated carboxylic acid and/or its derivative introduced is preferably 0.1 to 2.5 parts by weight. Furthermore, the weight of the portion modified with the unsaturated carboxylic acid and/or its derivative introduced is more preferably 0.3 parts by weight to 2.3 parts by weight.

In the weight range of the portion modified with the unsaturated carboxylic acid, when the polyamide 6 resin (A) and the impact modifier (B) are kneaded, the diameter of dispersed particle of the impact modifier (B) becomes small. The dispersion diameter will be described later.

As the effect, the weight of 0.1 parts by weight or more provides improved compatibility with the polyamide 6 resin (A), the impact modifier (B) having a small dispersion diameter and a high melt tension, which is less likely to disadvantageously cause drawdown during blow-molding. Furthermore, the take-up speed at strand break increases, to be less likely to disadvantageously cause tearing when air is blown during blow-molding, which is preferable. By setting the weight to 2.5 parts by weight or less, gelation caused from an abnormal reaction with the polyamide 6 resin (A) is suppressed. This is less likely to disadvantageously cause machine stoppage caused by an increased load during blow-molding by deteriorated melt flowability. Furthermore, the take-up speed at strand break increases, to be less likely to disadvantageously cause tearing when air is blown during blow-molding, which is preferable.

Preferred ethylene/α-olefin copolymers are copolymers of ethylene and α-olefins having 3 to 20 carbon atoms. Specific examples of the α-olefins having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. Two or more of these may be used. Among these α-olefins, α-olefins having 3 to 12 carbon atoms are preferable from the viewpoint of improving mechanical strength. Furthermore, at least one of unconjugated dienes such as 1,4-hexadiene, dicyclopentadiene, 2,5-norbornadiene, 5-ethylidenenorbornene, 5-ethyl-2,5-norbornadiene, and 5-(1'-propenyl)-2-norbornene may be copolymerized. Copolymers of ethylene modified with an unsaturated carboxylic acid and/or its derivative and α-olefins having 3 to 12 carbon atoms are more preferable because such copolymers can further improve the compatibility with the polyamide 6 resin (A), to provide further improved blow moldability and toughness. The occurrence of defects can be suppressed even if charging and discharging of higher-pressure hydrogen gas are repeated. The α-olefin content of the ethylene/α-olefin copolymer is preferably 1 to 30 mol %, more preferably 2 to 25 mol %, and still more preferably 3 to 20 mol %.

The composition and structure of fine particles of the impact modifier (B) are not particularly limited, and may be a so-called "core-shell" multilayer structure including at least one layer made of rubber and one or more layers made of polymers different from the rubber. The number of layers constituting the multilayer structure may be two or more, or may be three or more or four or more, but the multilayer structure preferably has at least one inner rubber layer (core layer). Examples of the type of rubber constituting the rubber layer of the multilayer structure include, but are not limited to, rubbers obtained by polymerizing acrylic components, silicone components, styrene components, nitrile components, conjugated diene components, urethane components, ethylene components, propylene components, and isobutene components and the like. The different polymers constituting the layers other than the rubber layer of the multilayer structure are not particularly limited as long as the polymers are any polymers having thermoplasticity, but the different polymers are preferably polymers having glass transition temperatures higher than that of the rubber layer. In a copolymer composition, an amount of modification, and a structure used as the impact modifier, the different polymers may have a glass transition temperature of 0° C. or lower. Examples of the polymers having thermoplasticity include polymers containing unsaturated carboxylic acid alkyl ester units, unsaturated carboxylic acid units, unsaturated-glycidyl-containing units, unsaturated dicarboxylic anhydride units, aliphatic vinyl units, aromatic vinyl units, vinyl cyanide units, maleimide units, unsaturated dicarboxylic acid units, and other vinyl units.

Metal Halide (C)

Examples of the metal halides (C) include alkali metal halides such as lithium iodide, sodium iodide, potassium iodide, lithium bromide, sodium bromide, potassium bromide, lithium chloride, sodium chloride, and potassium chloride; alkali earth metal halides such as magnesium iodide, calcium iodide, magnesium bromide, calcium bromide, magnesium chloride, and calcium chloride; Group 7 metal halides such as manganese(II) iodide, manganese(II) bromide, and manganese(II) chloride; Group 8 metal halides such as iron(II) iodide, iron(II) bromide, and iron(II) chloride; Group 9 metal halides such as cobalt(II) iodide, cobalt (II) bromide, and cobalt(II) chloride; Group 10 metal halides such as nickel(II) iodide, nickel(II) bromide, and nickel(II) chloride; Group 11 metal halides such as copper(I) iodide, copper(I) bromide, and copper(I) chloride; Group 12 metal halides such as zinc iodide, zinc bromide, and zinc chloride; Group 13 metal halides such as aluminum(III) iodide, aluminum(III) bromide, and aluminum(III) chloride; Group 14 metal halides such as tin(II) iodide, tin(II) bromide, and tin(II) chloride; and Group 15 metal halides such as antimony triiodide, antimony tribromide, antimony trichloride, bismuth(III) iodide, bismuth(III) bromide, and bismuth(III) chloride. Two or more of these may be used in combination.

Among these, alkali metal halides and/or copper iodide are preferable from the viewpoints of being easily available, having excellent dispersibility in the polyamide 6 resin (A), having higher reactivity with radicals, and further improving melt stability. Among the alkali metal halides, an alkali metal iodide is more preferably used from the viewpoint of reducing the amount of gas generated.

Polyamide Resin Composition

The polyamide resin composition contains 70 to 99 parts by weight of a polyamide 6 resin (A), 1 to 30 parts by weight of an impact modifier (B), and 0.005 to 1 parts by weight of a metal halide (C) with respect to a total of 100 parts by weight of the polyamide 6 resin (A) and the impact modifier (B).

If the blending amount of the polyamide 6 resin (A) is less than 70 parts by weight, the gas barrier properties of a blow-molded article made of the polyamide resin composition to be obtained are deteriorated. If charging and discharging of high-pressure hydrogen gas are repeated, defects occur. The blending amount of the polyamide 6 resin (A) is preferably 75 parts by weight or more, and more preferably 80 parts by weight or more. Meanwhile, if the blending amount of the polyamide 6 resin (A) is more than 99 parts by weight, the toughness of a blow-molded article made of the polyamide resin composition to be obtained is deteriorated. Cracks occur if charging and discharging of high-pressure hydrogen gas are repeated. The blending amount of the polyamide 6 resin (A) is preferably 97 parts by weight or less, and more preferably 95 parts by weight or less.

The blending amount of the impact modifier (B) is 1 to 30 parts by weight, preferably 3 parts by weight or more, and more preferably 5 parts by weight or more. The blending amount of the impact modifier (B) is preferably 25 parts by weight or less, and more preferably 20 parts by weight or less. If the blending amount of the impact modifier (B) is less than 1 part by weight, the toughness of a blow-molded article made of the polyamide resin composition to be obtained is deteriorated. If charging and discharging of high-pressure hydrogen gas are repeated, cracks occur. Meanwhile, if the blending amount of the impact modifier (B) is more than 30 parts by weight, the gas barrier properties of a blow-molded article made of the polyamide resin composition to be obtained are deteriorated. If charging and discharging of high-pressure hydrogen gas are repeated, defects occur.

The blending amount of the metal halide (C) is preferably 0.005 to 1 part by weight with respect to a total of 100 parts by weight of the polyamide 6 resin (A) and the impact modifier (B), but if the blending amount of the metal halide (C) is less than 0.005 parts by weight, the melt stability during blow-molding of a polyamide resin composition to be obtained is deteriorated, which causes blow-molded article having deteriorated toughness. The blending amount of the metal halide (C) is preferably 0.02 parts by weight or more, and more preferably 0.04 parts by weight or more, from the viewpoint of further improving the melt stability. Meanwhile, when the blending amount of the metal halide (C) is more than 1 part by weight, self-aggregation of the metal halide (C) proceeds and thereby the dispersion diameter becomes coarse so that the blow-molded article made of the polyamide resin composition to be obtained has deteriorated mechanical properties. The coarse dispersed particle causes a lowered surface area to cause a lowered reaction between the metal halide (C) and radicals so that the melt stability during blow-molding of the polyamide resin composition to be obtained is deteriorated, which causes the blow-molded article having deteriorated toughness. The blending amount of the metal halide (C) is preferably 0.5 parts by weight or less, and more preferably 0.3 parts by weight or less.

In a method of providing a polyamide resin composition having a high melt tension and a high take-up speed at strand break, the dispersion diameter of the impact modifier (B) is desirably small. In a method of reducing the dispersion diameter of the impact modifier (B), for example, it is preferable that a resin is kneaded while a resin temperature is controlled to a relatively high temperature of 235° C. to 330° C. The resin temperature is a value measured by directly inserting a contact-type resin thermometer into a die hole. The dispersion diameter of the impact modifier (B) dispersed in the polyamide resin composition can be finely controlled; an interface between the polyamide 6 resin (A) and the impact modifier (B) increases; the melt tension of the polyamide resin composition increases; and the polyamide resin composition is likely to be uniformly stretched. This makes it possible to withstand a high take-up speed at strand break, which is preferable. The average dispersion diameter of the impact modifier (B) dispersed in the polyamide resin composition is preferably 0.01 μm or more and 0.5 μm or less, more preferably 0.02 μm or more and 0.3 μm or less, and still more preferably 0.05 μm or more and 0.2 μm or less.

The average dispersion diameter of the impact modifier (B) can be calculated, for example, by cutting an ultrathin section from a polyamide resin composition pellet, staining the impact modifier (B) in the cross section of the ultrathin section, observing the ultrathin section using a transmission electron microscope, and determining the diameter of dispersed particles by image analysis. When the particles are not perfect circles, average values of major axes and minor axes are calculated, and the average dispersion diameter is calculated as an average value of the major axes and the minor axes.

With the polyamide resin composition, other components than the components (A), (B), and (C) may be blended if necessary, as long as the properties of the composition are not impaired. Examples of the other components include fillers, thermoplastic resins other than the component (A), and various additives.

For example, the filler is blended, whereby a molded article having improved strength and dimensional stability and the like can be provided. The shape of the filler may be fibrous or non-fibrous, and a fibrous filler and a non-fibrous filler may be used in combination. Examples of the fibrous fillers include glass fibers, glass milled fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers, and metal fibers. Examples of the non-fibrous fillers include silicates such as wollastonite, zeolite, sericite, kaolin, mica, clay, pyrophyllite, bentonite, asbestos, talc, and alumina silicate; metal oxides such as alumina, silicon oxide, magnesium oxide, zirconium oxide, titanium oxide, and iron oxide; metal carbonates such as calcium carbonate, magnesium carbonate, and dolomite; metal sulfates such as calcium sulfate and barium sulfate; metal hydroxides such as magnesium hydroxide, calcium hydroxide, and aluminum hydroxide; and glass beads, ceramic beads, boron nitride, and silicon carbide. These fillers may be hollow. These fibrous fillers and/or non-fibrous fillers are preferably pretreated with coupling agents before use to provide more excellent mechanical properties. Examples of the coupling agents include isocyanate compounds, organic silane compounds, organic titanate compounds, organic borane compounds, and epoxy compounds.

Examples of the thermoplastic resins include polyamide resins other than the polyamide 6 resin (A), polyester resins, polyphenylene sulfide resins, polyphenylene oxide resins, polycarbonate resins, polylactic resins, polyacetal resins, polysulfone resins, polytetrafluoroethylene resins, polyetherimide resins, polyamide-imide resins, polyimide resins, polyethersulfone resins, polyether ketone resins, polythioether ketone resins, polyether ether ketone resins, styrene resins such as polystyrene resins and ABS resins, and polyalkylene oxide resins. Two or more of these thermoplastic resins may be blended. The blending amount of the polyamide resin other than the polyamide 6 resin (A) is preferably 4 parts by weight or less with respect to 100 parts by weight of the polyamide 6 resin (A).

Examples of the various additives include anti-coloring agents, antioxidants such as hindered phenols and hindered amines, release agents such as ethylene bisstearyl amides and higher fatty acid esters, plasticizers, heat stabilizers, lubricants, ultraviolet absorbers, coloring agents, flame retardants, and blowing agents.

The polyamide resin composition has a melt tension of 20 mN or more when measured at 260° C. and a take-up speed at strand break of 50 m/min or more when measured at 260° C. If the melt tension of the polyamide resin composition when measured at 260° C. is 20 mN or more and the take-up speed at strand break when measured at 260° C. is 50 m/min or more, the polyamide resin composition is likely to be uniformly stretched during blow-molding, and can suppress a local increase in a residual strain, and the occurrence of defects and cracks when charging and discharging of high-pressure hydrogen gas are repeated.

The polyamide resin composition preferably has a melt tension of 20 to 500 mN, more preferably 25 to 500 mN, and still more preferably 30 to 300 mN. The melt tension of the polyamide resin composition when measured at 260° C. is 20 mN or more, which can suppress drawdown during blow-molding, provide a blow-molded article with a less residual strain, and suppress the occurrence of defects and cracks when charging and discharging of high-pressure hydrogen gas are repeated. The melt tension of the polyamide resin composition when measured at 260° C. is 500 mN or less, which can suppress deterioration in stretchability.

The polyamide resin composition preferably has a take-up speed at strand break of 50 m/min or more, more preferably 60 m/min or more, and still more preferably 80 m/min or more. If the take-up speed at strand break of the polyamide resin composition when measured at 260° C. is 50 m/min or more, no tearing occurs when air is blown during blow-molding, which can provide a blow-molded article.

The melt tension of the polyamide resin composition is measured as follows. Capillograph 1C (cylinder inner diameter: 9.55 mm, orifice length: 10.0 mm, inner diameter: 1.0 mm) manufactured by Toyo Seiki Seisakusho Co., Ltd. is used, and a test temperature is set to 260° C. A polyamide resin composition is filled in a cylinder, compacted, and held for 20 minutes to melt the polyamide resin composition. Then, the melted resin is extruded in a strand form at 260° C. from an orifice at a piston speed of 10 mm/min. This strand is wound through a lower circular guide of a tension detection pulley at a take-up speed of 10 m/min, and a tension to be detected is taken as the melt tension of the polyamide resin composition.

The means for setting the melt tension of the polyamide resin composition within the above range is not particularly limited as long as such a polyamide resin composition can be obtained, but a method using a polyamide 6 resin (A) having a relative viscosity of 3.3 to 7.0, as measured at 25° C. in a 98% concentrated sulfuric acid solution having a resin concentration of 0.01 g/ml, and a method using an ethylene/α-olefin copolymer modified with an unsaturated carboxylic acid and/or its derivative as the impact modifier (B) are preferably used. A method using a modified ethylene/α-olefin copolymer modified with 0.1 to 2.5 parts by weight of an unsaturated carboxylic acid and/or its derivative with respect to 100 parts by weight of the ethylene/α-olefin copolymer is preferably used. Specifically, an impact modifier (B) is preferably used, in which an amount of an unsaturated carboxylic acid and/or its derivative introduced from the modification is 0.1 to 2.5 parts by weight with respect to 100 parts by weight of the ethylene/α-olefin copolymer modified with an unsaturated carboxylic acid and/or its derivative.

The take-up speed at strand break of the polyamide resin composition is measured as follows. Capillograph 1C (cylinder inner diameter: 9.55 mm, orifice length: 10.0 mm, inner diameter: 1.0 mm) manufactured by Toyo Seiki Seisakusho Co., Ltd. is used, and a test temperature is set to 260° C. A polyamide resin composition is filled in a cylinder, compacted, and held for 20 minutes to melt the polyamide resin composition. Then, the melted resin is extruded in a strand form at 260° C. from an orifice at a piston speed of 10 mm/min. This strand is wound through a lower circular guide of a tension detection pulley at a take-up speed of 10 m/min to stabilize a tension to be detected. After the tension is stabilized, the strand is wound while the take-up speed is accelerated at an acceleration of 400 m/min$^2$, and a take-up speed at the time when the strand is broken is taken as the take-up speed at strand break of the polyamide resin composition. A limit value for measuring the take-up speed at strand break of the polyamide resin composition in the above measuring method is 200 m/min, but if other measuring methods are used, the limit value may be 200 m/min or more. If the limit value is 50 m/min or more, no tearing occurs when air is blown during blow-molding, which can provide a blow-molded article.

The means for setting the take-up speed at strand break of the polyamide resin composition within the above range is not particularly limited as long as such a polyamide resin composition can be obtained, but a method using an ethylene/α-olefin copolymer modified with an unsaturated carboxylic acid and/or its derivative as the impact modifier (B) is preferably used. A method using a modified ethylene/α-olefin copolymer modified with 0.1 to 2.5 parts by weight of an unsaturated carboxylic acid and/or its derivative with respect to 100 parts by weight of the ethylene/α-olefin copolymer is preferably used. Specifically, preferred is a method using an impact modifier (B) in which an amount of an unsaturated carboxylic acid and/or its derivative introduced from the modification is 0.1 to 2.5 parts by weight with respect to 100 parts by weight of an ethylene/α-olefin copolymer modified with an unsaturated carboxylic acid and/or its derivative.

Examples of the method of producing the polyamide resin composition include production in a melt state and production in a solution state. From the viewpoint of productivity, production in a melt state can be preferably used. For production in a melt state, melt-kneading with an extruder, a Banbury mixer, a kneader, or a mixing roll or the like can be used, and from the viewpoint of productivity, melt-kneading with an extruder allowing continuous production can be preferably used. Examples of the extruder include a single-screw extruder, a twin-screw extruder, a multi-screw extruder such as a four-screw extruder, and a twin-screw single-screw composite extruder. A plurality of these extruders may be combined. From the viewpoint of improving kneadability, reactivity, and productivity, a multi-screw extruder such as a twin-screw extruder or a four-screw extruder is preferable, and a twin-screw extruder is more preferable.

Examples of the melt-kneading method using the twin-screw extruder include a technique in which a polyamide 6 resin (A), an impact modifier (B), a metal halide (C) and, if necessary, components other than the components (A), (B), and (C) are premixed, and the mixture is supplied to a twin-screw extruder whose a cylinder temperature is set to be equal to or higher than the melting point of the polyamide 6 resin (A) to melt-knead the mixture. The mixing order of the raw materials is not particularly limited, and the following methods may be used: all raw materials are melt-kneaded by the above method; some raw materials are melt-kneaded by the above method, and the melt-kneaded product is blended with the remaining raw materials, followed by melt-kneading; and some raw materials are melt-kneaded while the remaining raw materials are mixed by using a side feeder. A method removing gas generated by exposing raw materials to a vacuum state in an extruder is also preferably used.

A resin temperature during melt-kneading using a twin-screw extruder is preferably controlled to 235° C. to 330° C. By controlling the resin temperature during melt-kneading to 235° C. or higher, the dispersion diameter of the impact modifier (B) dispersed in the polyamide resin composition can be finely controlled; an interface between the polyamide 6 resin (A) and the impact modifier (B) increases; the melt tension increases; and the polyamide resin composition is likely to be uniformly stretched. This makes it possible to withstand a high take-up speed at strand break, which is preferable. The resin temperature during melt-kneading is controlled to 330° C. or lower, whereby the decomposition of the polyamide 6 resin (A) and impact modifier (B) is suppressed; the melt tension further increases; and the resin is likely to be uniformly stretched. This makes it possible to withstand a high take-up speed at strand break, which is preferable. The resin temperature is a value measured by directly inserting a contact-type resin thermometer into a die hole.

The polyamide resin composition can be blow-molded to provide a molded article.

The blow-molded article is used for a blow-molded article exposed to high-pressure hydrogen gas, taking advantage of its excellent feature suppressing the occurrence of defects even if charging and discharging of high-pressure hydrogen gas are repeated. The blow-molded article exposed to high-pressure hydrogen gas as used herein is a blow-molded article exposed to hydrogen gas at a normal pressure or more. Since the blow-molded article exhibits an effect of suppressing the occurrence of defects when charging and discharging of high-pressure hydrogen gas are repeated, the blow-molded article is preferably used in the application of the blow-molded article exposed to hydrogen gas at a pressure of 20 MPa or more, and preferably used in the application of the blow-molded article exposed to hydrogen gas at a pressure of 30 MPa or more. Meanwhile, the blow-molded article is preferably used in the application of the blow-molded article exposed to hydrogen gas at a pressure of 200 MPa or less, more preferably used in the application of the blow-molded article exposed to hydrogen gas at a pressure of 150 MPa or less, and still more preferably used in the application of the blow-molded article exposed to hydrogen gas at a pressure of 100 MPa or less. Examples of the blow-molded article exposed to high-pressure hydrogen gas include tanks for high-pressure hydrogen gas, tank liners for high-pressure hydrogen gas, pipes for high-pressure hydrogen gas, pumps for high-pressure hydrogen gas, and tubes for high-pressure hydrogen gas. Above all, the blow-molded article can be preferably used for high-pressure hydrogen gas containers such as tanks for high-pressure hydrogen gas and tank liners for high-pressure hydrogen gas.

A standard deviation of residual strains measured at four locations of a torso part of the tank liner for high-pressure hydrogen gas at equal intervals in a longitudinal direction is preferably 3 or less. If the standard deviation of the residual strains measured at four locations of the torso part of the tank liner for high-pressure hydrogen gas at equal intervals in the longitudinal direction is more than 3, the residual strain is locally large, and defects and cracks are apt to occur at the location in which the residual strain is locally large when charging and discharging of high-pressure hydrogen gas are repeated.

The high-pressure hydrogen gas tank liner can suppress the occurrence of defects and cracks even if charging and discharging of higher-pressure hydrogen gas are repeated, whereby the standard deviation σ of residual strains measured at four locations of the torso part at equal intervals in the longitudinal direction is preferably 2.5 or less, and more preferably 2 or less. The torso part is a portion where the diameter of a cylinder is uniform. The four locations in the longitudinal direction are, for example, a total of four locations of two locations near both ends and two locations dividing a distance between the two locations into three equal parts.

To measure the residual strain in the longitudinal direction, four strain gauges are attached on the same line at equal intervals on the torso part of the high-pressure hydrogen gas tank liner, and the circumference of each of the strain gauges is then cut to measure an amount of a strain released from the strain gauge. The standard deviation σ of the residual strains can be calculated by formulae (1), (2) and (3) using the obtained strain amount (residual strain) $x_k$.

$$x=(1/4)\Sigma x_k \ (k=1 \text{ to } 4) \quad (1)$$

$$V=(1/4)\Sigma(x_k-x)^2 \ (k=1 \text{ to } 4) \quad (2)$$

$$\sigma=\sqrt{V} \quad (3)$$

x: Average of residual strains at four locations $x_k$: Residual strain at each location (%)

V: Dispersion of residual strains

σ: Standard deviation of residual strains

The thickness of the blow-molded article in which the standard deviation σ of the residual strains measured at four locations of the torso part of the high-pressure hydrogen gas tank liner at equal intervals in the longitudinal direction is 3 or less is not particularly limited, but it is preferably 0.5 mm to 5 mm.

To set the standard deviation σ of the residual strains measured at four locations of the torso part of the high-pressure hydrogen gas tank liner at equal intervals in the longitudinal direction to 3 or less, for example, the polyamide resin composition is used, which has a melt tension of 20 mN or more when measured at 260° C. and a take-up speed at strand break of 50 m/min or more when measured at 260° C.

EXAMPLES

Hereinafter, characteristics of our compositions and blow-molded products will be more specifically described with reference to Examples. This disclosure is not limited to the following Examples. Evaluations in Examples and Comparative Examples were conducted by the following methods.

(1) Resistance to Repeated Charging and Discharging of High-Pressure Hydrogen Gas (Defects)

Blow-molded articles obtained in Examples 1 to 4 and Comparative Examples 5 to 8 were subjected to X-ray CT analysis to observe the presence or absence of defects. A blow-molded article having no defects was placed in an autoclave, and hydrogen gas was then injected into the autoclave over five minutes to a pressure of 20 MPa. The pressure was held for 1 hour, and then reduced to atmospheric pressure over five minutes. This was set as one cycle, and repeated for 100 cycles. Test pieces after 100 cycles were subjected to X-ray CT analysis using “TDM1000-IS” manufactured by Yamato Scientific Co., Ltd. to observe the presence or absence of defects of 10 μm or more. Test pieces having no defects were taken as “absence”, and test pieces having defects were taken as “presence”.

(2) Tensile Elongation (Toughness)

Five test pieces having a height of 100 mm and a width of 5 mm were cut out with a longitudinal direction as a height direction from a torso part of each of the blow-molded articles (thickness: about 3 mm) obtained in Examples 1 to 4 and Comparative Examples 5 to 8. Each of the test pieces was subjected to humidity conditioning for 30 minutes under the conditions of a temperature of 23° C. and a humidity of 50%, and then subjected to a tensile test at a distance between chucks of 50 mm and a speed of 10 mm/min to evaluate the tensile elongation of the test piece. The average value of measured values of the five test pieces was taken as the tensile elongation. The tensile elongation of the blow-molded article, of 50% or more indicates toughness maintained even after heat is applied during blow-molding, and high thermal stability.

(3) Melt Tension

With the pellets obtained in each of Examples and Comparative Examples, the polyamide resin composition is filled in a cylinder in which a test temperature is set to 260° C. using Capillograph 1C (cylinder inner diameter: 9.55 mm, orifice length: 10.0 mm, inner diameter: 1.0 mm) manufactured by Toyo Seiki Seisakusho Co., Ltd. The pellets are compacted and held for 20 minutes to melt the pellets, and the melted resin is then extruded in a strand form at 260° C. from an orifice at a piston speed of 10 mm/min. This strand was wound through a lower circular guide of a tension detection pulley at a take-up speed of 10 m/min, and a tension to be detected was taken as the melt tension of the polyamide resin composition.

(4) Take-Up Speed at Strand Break

With the pellets obtained in each of Examples and Comparative Examples, the polyamide resin composition is filled in a cylinder in which a test temperature is set to 260° C. using Capillograph 1C (cylinder inner diameter: 9.55 mm, orifice length: 10.0 mm, inner diameter: 1.0 mm) manufactured by Toyo Seiki Seisakusho Co., Ltd. The pellets are compacted and held for 20 minutes to melt the pellets, and the melted resin is then extruded in a strand form at 260° C. from an orifice at a piston speed of 10 mm/min. This strand was wound through a lower circular guide of a tension detection pulley at a take-up speed of 10 m/min to stabilize a tension to be detected. After the tension was stabilized, the strand was wound while the take-up speed was accelerated at an acceleration of 400 m/min$^2$, and a take-up speed at the time when the strand was broken was taken as the take-up speed at strand break of the polyamide resin composition.

(5) Standard Deviation of Residual Strains Measured at Four Locations of Torso Part at Equal Intervals in Longitudinal Direction (Standard Deviation of Residual Strains)

Four strain gauges were attached at equal intervals on the torso part of each of the blow-molded articles obtained in Examples 1 to 4 and Comparative Examples 5 to 8 so that the residual strain in the longitudinal direction could be measured, and the circumference of each of the strain gauges was then cut to measure an amount of a strain released from the strain gauge. A standard deviation σ was calculated from the obtained amount of strain (residual strain) $x_k$ according to formulae (1), (2) and (3).

$$x=(1/4)\Sigma x_k \ (k=1 \text{ to } 4) \quad (1)$$

$$V=(1/4)\Sigma(x_k-x)^2 \ (k=1 \text{ to } 4) \quad (2)$$

$$\sigma=\sqrt{V} \quad (3)$$

x: Average of residual strains at four locations $x_k$: Residual strain at each location (%)

V: Dispersion of residual strains

σ: Standard deviation of residual strains

Raw materials used in Examples and Comparative Examples and abbreviations thereof will be described below.

Raw Materials of Polyamide 6 Resin (A) and Abbreviations Thereof

PA6 (η2.7): Polyamide 6 resin (relative viscosity at 25° C. in a 98% concentrated sulfuric acid solution having a resin concentration of 0.01 g/ml: 2.70)

PA6 (η3.0): Polyamide 6 resin (relative viscosity at 25° C. in a 98% concentrated sulfuric acid solution having a resin concentration of 0.01 g/ml: 3.00)

PA6 (η4.4): Polyamide 6 resin (relative viscosity at 25° C. in a 98% concentrated sulfuric acid solution having a resin concentration of 0.01 g/ml: 4.40)

PA6/PA66 copolymer: Polyamide 6/polyamide 66 copolymer (melting point: 190° C., relative viscosity at 25° C. in a 98% concentrated sulfuric acid solution having a resin concentration of 0.01 g/ml: 4.20)

Raw Materials of Impact Modifier (B) and Abbreviations Thereof

Impact Modifier 1: ethylene/1-butene copolymer (MFR (190° C., load of 2160 g) 0.5 g/10 minutes, density: 0.862 g/cm$^3$)

Impact Modifier 2: 1.05 parts by weight of maleic anhydride and 0.04 parts by weight of a peroxide (manufactured by NOF Corporation, trade name: Perhexyne 25B) are mixed with 100 parts by weight of an ethylene/1-butene copolymer having an MFR (190° C., load of 2160 g) of 0.5 g/10 minutes and a density of 0.862 g/cm$^3$, and the mixture is melt-extruded at a cylinder temperature of 230° C. using a twin-screw extruder to obtain an impact modifier 2. The obtained impact modifier 2 is an ethylene/1-butene copolymer modified with maleic anhydride, and the amount of the ethylene/1-butene copolymer modified with respect to 100 parts by weight of the ethylene/1-butene copolymer is 1.0 part by weight. Specifically, when the weight of an ethylene/1-butene copolymer whose a part of side chains are modified with maleic anhydride and into which an unsaturated carboxylic acid is introduced is 100 parts by weight, the weight of the introduced unsaturated carboxylic acid modified part is 1.0 part by weight.

For the measurement of each part by weight, 100 parts by weight of an ethylene/1-butene copolymer and 1.05 parts by weight of maleic anhydride are melt-kneaded, and the weight of pellets of the obtained ethylene/1-butene copolymer into which an unsaturated carboxylic acid has been introduced is measured. The weight of the unsaturated carboxylic acid-modified part is obtained by dissolving an unsaturated carboxylic acid in xylene at 130° C., preparing an ethanol titration solution of 0.02 mol/L potassium hydroxide (manufactured by Aldrich) as a titration solution, and an ethanol solution of 1% phenolphthalein as an indicator, and converting the molar concentration of the unsaturated carboxylic acid obtained by titration into mass. The weight of the unsaturated carboxylic acid-modified ethylene/1-butene copolymer was converted per 100 parts by weight, and taken as "the weight of the introduced unsaturated carboxylic acid-modified part".

Impact Modifier 3: 2.1 parts by weight of maleic anhydride and 0.1 parts by weight of a peroxide (manufactured by NOF Corporation, trade name: Perhexyne 25B) are mixed with 100 parts by weight of an ethylene/1-butene copolymer having an MFR (190° C., load of 2160 g) of 0.5 g/10 minutes and a density of 0.862 g/cm$^3$, and the mixture is melt-extruded at a cylinder temperature of 230° C. using a twin-screw extruder to obtain an impact modifier 3. The obtained impact modifier 3 is an ethylene/1-butene copolymer modified with maleic anhydride, and the amount of the ethylene/1-butene copolymer modified with respect to 100 parts by weight of the ethylene/1-butene copolymer is 2.0 parts by weight. Specifically, when the weight of an ethylene/1-butene copolymer whose a part of side chains are modified with maleic anhydride and into which an unsaturated carboxylic acid is introduced is 100 parts by weight, the weight of the introduced unsaturated carboxylic acid modified part is 2.0 parts by weight.

Impact Modifier 4: 3.32 parts by weight of maleic anhydride and 0.25 parts by weight of a peroxide (manufactured by NOF Corporation, trade name: Perhexyne 25B) are mixed with 100 parts by weight of an ethylene/1-butene copolymer having an MFR (190° C., load of 2160 g) of 0.5 g/10 minutes and a density of 0.862 g/cm$^3$, and the mixture is melt-extruded at a cylinder temperature of 230° C. using a twin-screw extruder to obtain an impact modifier 4. The obtained impact modifier 4 is an ethylene/1-butene copolymer modified with maleic anhydride, and the amount of the ethylene/1-butene copolymer modified with respect to 100 parts by weight of the ethylene/1-butene copolymer is 3.2 parts by weight. Specifically, when the weight of an ethylene/1-butene copolymer whose a part of side chains are modified with maleic anhydride and into which an unsaturated carboxylic acid is introduced is 100 parts by weight, the weight of the introduced unsaturated carboxylic acid modified part is 3.2 parts by weight.

Raw Materials of Metal Halide (C) and Abbreviations Thereof

Metal halide 1: Copper iodide (I) (manufactured by Wako Pure Chemical Industries, Ltd.)

Metal halide 2: Potassium iodide (manufactured by Wako Pure Chemical Industries, Ltd.)

Examples 1 to 4 and Comparative Examples 5 and 6

A twin-screw extruder (TEX30α-35BW-7V, manufactured by JSW) (L/D=45, wherein L is a distance between a raw material supply port and a discharge port, and D is a diameter of a screw) had a cylinder temperature set to 240° C., a screw arrangement including one kneading zone, and a screw speed of 150 rpm. Raw materials shown in Tables 1 and 2 were supplied into the extruder, and melt-kneaded. A gut discharged through a die at a speed of 20 kg/h was rapidly cooled by being passed through a cooling bath filled with water adjusted to 10° C. over 10 seconds, and then pelletized with a strand cutter to obtain pellets. The obtained pellets were vacuum dried in a vacuum dryer at 80° C. for 12 hours to obtain the dried pellets. A parison was extruded at a cylinder temperature of 260° C., a die diameter of φ80 mm, and a core diameter of φ50 mm from the obtained pellets using a blow-molding machine. Then, a mold set to 80° C. was closed, and air was blown thereinto to obtain a blow-molded article having a length of 500 mm and a diameter of φ300 mm. The results of evaluating the obtained blow-molded article according to the above-mentioned method were described in Tables 1 and 2.

In Example 1, 85 parts by weight of PA6 (ηr=4.4) as the polyamide 6 resin (A), 15 parts by weight of the impact modifier 2, and 0.1 parts by weight of the metal halide 1 were kneaded. A resin temperature during melt-kneading was 265° C. The average dispersion diameter of the impact modifier 2 of the obtained pellets was 0.13 μm so that the impact modifier 2 was finely dispersed. The obtained pellets had a melt tension of 70 mN and a take-up speed at strand break of 150 m/min, which was good. The blow-molded article had no defects, and had a standard deviation of residual strains of 0.45, which was good.

Example 2 was the same as Example 1 except that the impact modifier 2 of Example 1 was changed to the impact modifier 3. A resin temperature during melt-kneading was 272° C. The obtained pellets had a melt tension of 85 mN and a take-up speed at strand break of 107 m/min, which was good. The blow-molded article had no defects, and had a standard deviation of residual strains of 0.41, which was good.

Example 3 was the same as Example 1 except that a metal halide was changed. A resin temperature during melt-kneading was 267° C. The obtained pellets had a melt tension of 73 mN and a take-up speed at strand break of 165 m/min, which was good. The blow-molded article had no defects, and had a standard deviation of residual strains of 0.38, which was good.

Example 4 was the same as Example 1 except that a ratio of PA6 to the impact modifier 2 was changed. A resin temperature during melt-kneading was 258° C. The obtained pellets had a melt tension of 31 mN and a take-up speed at strand break exceeding 200 m/min, which was good. The blow-molded article had no defects, and had a standard deviation of residual strains of 0.81, which was within a range of causing no problem.

Meanwhile, Comparative Example 5 had no metal halide (C), and the blow-molded article had no defects, but burning occurred. In Comparative Example 6, PA6 (ηr=3.0), a PA6/PA66 copolymer (ηr=4.2), and an impact modifier 2 were used, and respective ratios were changed. The obtained pellets had a small melt tension of 18 mN and a take-up speed at strand break of 180 m/min. The blow-molded article had no defects, and a standard deviation of residual strains of 3.2.

Comparative Examples 1 to 3

A twin-screw extruder (TEX30α-35BW-7V, manufactured by JSW) (L/D=45, wherein L is a distance between a raw material supply port and a discharge port, and D is a diameter of a screw) had a cylinder temperature set to 240° C., a screw arrangement including one kneading zone, and a screw speed of 150 rpm. Raw materials shown in Table 2 were supplied into the extruder and melt-kneaded. A gut discharged through a die at a speed of 20 kg/h was rapidly cooled by being passed through a cooling bath filled with water adjusted to 10° C. over 10 seconds, and then pelletized with a strand cutter to obtain pellets. The obtained pellets were vacuum dried in a vacuum dryer at 80° C. for 12 hours to obtain the dried pellets. When a parison was extruded at a cylinder temperature of 260° C., a die diameter of φ80 mm, and a core diameter of φ50 mm from the obtained pellets using a blow-molding machine, drawdown occurred, which made it impossible to provide a blow-molded article.

In Comparative Examples 1 and 2, PA6 (ηr=2.7) was used. The obtained pellets had a small melt tension of 9 mN in Comparative Example 1 and 14 mN in Comparative Example 2, and a take-up speed at strand break exceeding 200 m/min. In Comparative Example 3, an impact modifier 1 (no unsaturated carboxylic acid modification) was used. The obtained pellets had a small melt tension of 18 mN and a low take-up speed at strand break of 25 m/min.

Comparative Example 4

A twin-screw extruder (TEX30α-35BW-7V, manufactured by JSW) (L/D=45, wherein L is a distance between a raw material supply port and a discharge port, and D is a diameter of a screw) had a cylinder temperature set to 240° C., a screw arrangement including one kneading zone, and a screw speed of 150 rpm. Raw materials shown in Table 2 were supplied into the extruder and melt-kneaded. A gut discharged through a die at a speed of 20 kg/h was rapidly cooled by being passed through a cooling bath filled with water adjusted to 10° C. over 10 seconds, and then pelletized with a strand cutter to obtain pellets. The obtained pellets were vacuum dried in a vacuum dryer at 80° C. for 12 hours to obtain the dried pellets. A parison was extruded at a cylinder temperature of 260° C., a die diameter of φ80 mm, and a core diameter of φ50 mm from the obtained pellets using a blow-molding machine. Then, a mold set to 80° C. was closed, and when air was blown thereinto, the parison was torn, which made it impossible to provide a blow-molded article.

In Comparative Example 4, an impact modifier 4 (unsaturated carboxylic acid modification amount of 3.2 parts by weight) was used. The obtained pellets had a melt tension of 92 mN, but had a low take-up speed at strand break of 38 m/min.

Comparative Example 7

A twin-screw extruder (TEX30α-35BW-7V, manufactured by JSW) (L/D=45, wherein L is a distance between a raw material supply port and a discharge port, and D is a diameter of a screw) had a cylinder temperature set to 225° C., a screw arrangement including one kneading zone, and a screw speed of 100 rpm. Raw materials shown in Table 2 were supplied into the extruder and melt-kneaded. A gut discharged through a die at a speed of 20 kg/h was rapidly cooled by being passed through a cooling bath filled with water adjusted to 10° C. over 10 seconds, and then pelletized with a strand cutter to obtain pellets. The obtained pellets were vacuum dried in a vacuum dryer at 80° C. for 12 hours to obtain the dried pellets. A parison was extruded at a cylinder temperature of 260° C., a die diameter of φ80 mm, and a core diameter of φ50 mm from the obtained pellets using a blow-molding machine. Then, a mold set to 80° C. was closed, and air was blown thereinto to obtain a blow-molded article having a length of 500 mm and a diameter of φ300 mm. The results of evaluating the obtained blow-molded article according to the above-mentioned method were described in Table 2.

In Comparative Example 7, the resin composition was the same as that of Example 1, but a resin temperature during melting was as low as 232° C. The average dispersion diameter of the impact modifier 2 of the obtained pellets was 0.62 μm so that the impact modifier 2 was coarsely dispersed. The obtained pellets had a low melt tension of 19 mN and a take-up speed at strand break of 65 m/min. The blow-molded article had defects, and had a standard deviation of residual strains of 3.2, which had large variance.

Comparative Example 8

A twin-screw extruder (TEX30α-35BW-7V, manufactured by JSW) (L/D=45, wherein L is a distance between a raw material supply port and a discharge port, and D is a diameter of a screw) had a cylinder temperature set to 300° C., a screw arrangement including three kneading zones, and a screw speed of 300 rpm. Raw materials shown in Table 2 were supplied into the extruder and melt-kneaded. A gut discharged through a die at a speed of 20 kg/h was rapidly cooled by being passed through a cooling bath filled with water adjusted to 10° C. over 10 seconds, and then pelletized with a strand cutter to obtain pellets. The obtained pellets were vacuum dried in a vacuum dryer at 80° C. for 12 hours to obtain the dried pellets. A parison was extruded at a cylinder temperature of 260° C., a die diameter of 80 mm, and a core diameter of 50 mm from the obtained pellets using a blow-molding machine. Then, a mold set to 80° C. was closed, and air was blown thereinto to obtain a blow-molded article having a length of 500 mm and a diameter of 300 mm. The results of evaluating the obtained blow-molded article according to the above-mentioned method were described in Table 2.

In Comparative Example 8, the resin composition was the same as that of Example 1, but a resin temperature during melting was as high as 340° C. The obtained pellets had a low melt tension of 19 mN and a take-up speed at strand break of 72 m/min. The blow-molded article had defects, and had a standard deviation of residual strains of 3.1, which had large variance.

TABLE 1

| | | | Example 1 | Example 2 | Example 3 | Example 4 |
|---|---|---|---|---|---|---|
| Compositions | PA6 (ηr = 2.7) | Parts by weight | | | | |
| | PA6 (ηr = 3.0) | Parts by weight | | | | |
| | PA6 (ηr = 4.4) | Parts by weight | 85 | 85 | 85 | 90 |
| | PA6/PA66 copolymer | Parts by weight | | | | |
| | Impact modifier 1 | Parts by weight | | | | |
| | Impact modifier 2 | Parts by weight | 15 | | 15 | 10 |
| | Impact modifier 3 | Parts by weight | | 15 | | |
| | Impact modifier 4 | Parts by weight | | | | |
| | Metal halide 1 | Parts by weight | 0.1 | 0.1 | 0.1 | 0.1 |
| | Metal halide 2 | Parts by weight | | | 0.1 | |
| Evaluation results | Resin temperature during melt kneading (when pellets are obtained) | ° C. | 265 | 272 | 267 | 258 |
| | Failure points | — | Absence | Absence | Absence | Absence |
| | Tensile elongation | % | 195 | 180 | 205 | 140 |
| | Melt tension | mN | 70 | 85 | 73 | 31 |
| | Take-up speed at strand break | m/min | 150 | 107 | 165 | >200 |
| | Standard deviation of residual strains | — | 0.45 | 0.41 | 0.38 | 0.81 |

TABLE 2-1

| | | | Comparative Example 1 | Comparative Example 2 | Comparative Example 3 | Comparative Example 4 |
|---|---|---|---|---|---|---|
| Compositions | PA6 (ηr = 2.7) | Parts by weight | 85 | 85 | | |
| | PA6 (ηr = 3.0) | Parts by weight | | | | |
| | PA6 (ηr = 4.4) | Parts by weight | | | 85 | 85 |
| | PA6/PA66 copolymer | Parts by weight | | | | |

TABLE 2-1-continued

| | | | Comparative Example 1 | Comparative Example 2 | Comparative Example 3 | Comparative Example 4 |
|---|---|---|---|---|---|---|
| | Impact modifier 1 | Parts by weight | | | 15 | |
| | Impact modifier 2 | Parts by weight | 15 | | | |
| | Impact modifier 3 | Parts by weight | | 15 | | |
| | Impact modifier 4 | Parts by weight | | | | 15 |
| | Metal halide 1 | Parts by weight | 0.1 | 0.1 | 0.1 | 0.1 |
| | Metal halide 2 | Parts by weight | | | | |
| Evaluation results | Resin temperature during melt kneading (when pellets are obtained) | ° C. | 242 | 246 | 249 | 290 |
| | Failure points | — | Impossible blow molding | Impossible blow molding | Impossible blow molding | Impossible blow molding |
| | Tensile elongation | % | | | | |
| | Melt tension | mN | 9 | 14 | 18 | 92 |
| | Take-up speed at strand break | m/min | >200 | >200 | 25 | 38 |
| | Standard deviation of residual strains | — | — | — | — | — |

TABLE 2-2

| | | | Comparative Example 5 | Comparative Example 6 | Comparative Example 7 | Comparative Example 8 |
|---|---|---|---|---|---|---|
| Compositions | PA6 (ηr = 2.7) | Parts by weight | | | | |
| | PA6 (ηr = 3.0) | Parts by weight | | 62.5 | | |
| | PA6 (ηr = 4.4) | Parts by weight | 85 | | 85 | 85 |
| | PA6/PA66 copolymer | Parts by weight | | 20 | | |
| | Impact modifier 1 | Parts by weight | | | | |
| | Impact modifier 2 | Parts by weight | 15 | 17.5 | 15 | 15 |
| | Impact modifier 3 | Parts by weight | | | | |
| | Impact modifier 4 | Parts by weight | | | | |
| | Metal halide 1 | Parts by weight | | | 0.1 | 0.1 |
| | Metal halide 2 | Parts by weight | | | | |
| Evaluation results | Resin temperature during melt kneading (when pellets are obtained) | ° C. | 263 | 250 | 232 | 340 |
| | Failure points | — | Absence | Presence | Presence | Presence |
| | Tensile elongation | % | 30 | 45 | 32 | 31 |
| | Melt tension | mN | 68 | 18 | 19 | 19 |
| | Take-up speed at strand break | m/min | 125 | 180 | 65 | 72 |
| | Standard deviation of residual strains | — | 0.61 | 3.2 | 3.2 | 3.1 |

From the above results, the polyamide resin composition contains the polyamide 6 resin (A), the impact modifier (B), and the metal halide (C), wherein the polyamide resin composition has a melt tension of 20 mN when measured at 260° C. and a take-up speed at strand break of 50 m/min when measured at 260° C. The polyamide resin composition has a high melt tension and excellent drawdown resistance, and can withstand a high take-up speed, whereby tearing is less likely to occur when air is blown, to provide excellent blow moldability.

We found that the blow-molded article obtained by molding such a polyamide resin composition can suppress a local increase in a residual strain, suppresses the occurrence of defects even if charging and discharging of high-pressure hydrogen gas are repeated, and has excellent melt stability.

INDUSTRIAL APPLICABILITY

Since the polyamide resin composition has a high melt tension and excellent drawdown resistance, and can withstand a high take-up speed, the polyamide resin composition is less likely to cause tearing to occur when air is blown to provide excellent blow moldability, can suppress a local increase in a residual strain of a molded article, suppresses the occurrence of defects even if charging and discharging of high-pressure hydrogen gas are repeated, and has excellent melt stability. The blow-molded article obtained by blow-molding the polyamide resin composition can be widely used for blow-molded articles exposed to high-pressure hydrogen gas by taking advantage of these properties.

The invention claimed is:

1. A polyamide resin composition for a blow-molded article exposed to high-pressure hydrogen gas, the polyamide resin composition comprising:

70 to 99 parts by weight of a polyamide 6 resin (A);

1 to 30 parts by weight of an impact modifier (B); and 0.005 to 1 parts by weight of a metal halide (C) with respect to a total of 100 parts by weight of the polyamide 6 resin (A) and the impact modifier (B), wherein the polyamide 6 resin (A) has a relative viscosity (ηr) of 3.3 to 7.0 at a temperature of 25° C. in a 98% sulfuric acid solution having a resin concentration of 0.01 g/ml, the impact modifier (B) comprising an ethylene/α-olefin copolymer modified with an unsaturated carboxylic acid and/or its derivative, wherein the derivative of an unsaturated carboxylic acid is an unsaturated carboxylic acid compound having a carboxyl group, metal salts, acid halides, esters, acid anhydrides, amides, and imides of unsaturated carboxylic acids, an amount of the unsaturated carboxylic acid and/or its derivative introduced from the modification is 0.1 to 2.5 parts by weight with respect to 100 parts by weight of the ethylene/α-olefin copolymer modified with the unsaturated carboxylic acid and/or its derivative, using the following measurement, wherein the polyamide resin composition has a melt tension of 20 mN or more when measured at 260° C. and a take-up speed at strand break of 50 m/min or more when measured using Capillograph 1C (cylinder inner diameter: 9.55 mm, orifice length: 10.0 mm, inner diameter: 1.0 mm), pellets of the polyamide resin composition are filled in a cylinder in which a test temperature is set to 260° C., the pellets are compacted and held for 20 minutes to melt the pellets, and the melted resin is then extruded in a strand form at 260° C. from an orifice at a piston speed of 10 mm/min, winding the strand through a lower circular guide of a tension detection pulley at a take-up speed of 10 m/min, and a tension to be detected was taken as the melt tension of the polyamide resin composition, and after the melt tension was stabilized at a take-up speed of 10 m/min, the strand was wound while the take-up speed was accelerated at an acceleration of 400 m/min$^2$, and a take-up speed at the time when the strand was broken was taken as the take-up speed at strand break of the polyamide resin composition.

2. The polyamide resin composition for a blow-molded article exposed to high-pressure hydrogen gas according to claim 1, wherein the metal halide (C) contains an alkali metal halide and/or copper iodide.

3. A blow-molded article exposed to high-pressure hydrogen gas, comprising the polyamide resin composition according to claim 1.

4. A tank liner for high-pressure hydrogen gas, comprising the polyamide resin composition according to claim 1.

5. The tank liner according to claim 4, wherein a standard deviation of residual strains measured at four locations of a torso part of the tank liner for high-pressure hydrogen gas at equal intervals in a longitudinal direction is 3 or less.

6. A method of producing a tank liner for high-pressure hydrogen gas, comprising blow-molding the polyamide resin composition according to claim 1.

7. A blow-molded article exposed to high-pressure hydrogen gas, comprising the polyamide resin composition according to claim 2.

8. A tank liner for high-pressure hydrogen gas, comprising the polyamide resin composition according to claim 2.

9. A method of producing a tank liner for high-pressure hydrogen gas, comprising blow-molding the polyamide resin composition according to claim 2.

* * * * *